US005772830A

United States Patent [19]
Hasegawa

[11] Patent Number: 5,772,830
[45] Date of Patent: Jun. 30, 1998

[54] METHOD FOR BONDING WOOD MATERIALS

[75] Inventor: Katsuji Hasegawa, Ohbu, Japan

[73] Assignee: Meinan Machinery Works, Inc., Ohbu, Japan

[21] Appl. No.: 398,609

[22] Filed: Mar. 6, 1995

Related U.S. Application Data

[63] Continuation-in-part of Ser. No. 942,348, Sep. 9, 1992, abandoned, which is a continuation of Ser. No. 625,310, Dec. 10, 1990, abandoned.

[51] Int. Cl.$^6$ .................................................. B29C 65/10
[52] U.S. Cl. .......................... 156/292; 156/87; 156/257; 156/291; 156/497
[58] Field of Search ............................... 156/82, 87, 156, 156/257, 290, 292, 381, 382, 497, 291; 144/346, 348, 352, 368, 371; 165/168, 169, 170

[56] References Cited

U.S. PATENT DOCUMENTS

| | | |
|---|---|---|
| 1,884,612 | 10/1932 | Dinzl . |
| 2,610,938 | 9/1952 | Pasquier . |
| 2,627,290 | 2/1953 | Berthelsen . |
| 2,815,779 | 12/1957 | Higgins . |
| 3,003,205 | 10/1961 | Frashour et al. . |
| 3,907,624 | 9/1975 | Gravely . |
| 4,045,595 | 8/1977 | Chiu et al. . |
| 4,194,298 | 3/1980 | Hart . |
| 4,229,507 | 10/1980 | Kai et al. . |
| 4,231,908 | 11/1980 | Pennino . |
| 4,489,119 | 12/1984 | Ishige et al. . |
| 4,597,189 | 7/1986 | Cutrara . |
| 4,790,360 | 12/1988 | Clarke et al. . |
| 4,850,404 | 7/1989 | Koba . |
| 5,242,490 | 9/1993 | Maner . |
| 5,307,679 | 5/1994 | Ross . |

FOREIGN PATENT DOCUMENTS

| | | |
|---|---|---|
| 931005 | 7/1955 | Germany . |
| 2937477 | 4/1981 | Germany . |
| 3814589 | 11/1989 | Germany . |
| 43133 | 11/1974 | Japan . |
| 49310 | 4/1979 | Japan . |
| 205101 | 9/1991 | Japan . |
| 149153 | 11/1931 | Switzerland . |
| 193552 | 1/1938 | Switzerland . |
| 21460 | 12/1904 | United Kingdom . |
| 716347 | 10/1954 | United Kingdom . |
| 2099742 | 12/1982 | United Kingdom . |
| 2179592 | 3/1987 | United Kingdom . |
| WO88/02016 | 3/1988 | WIPO . |

*Primary Examiner*—Steven D. Maki
*Attorney, Agent, or Firm*—Lahive & Cockfield, LLP

[57] ABSTRACT

A method for bonding wood plies together comprises the steps of (i) forming passages in at least one of faces of the wood plies, except faces thereof for providing opposed faces of a bonded wood product, (ii) placing the wood plies on one another with a thermosetting adhesive material or materials between, and (iii) pressing the wood plies together transverse to the opposed faces of the wood plies, while blowing a heating fluid into the passages to heat and harden the adhesive material or materials. The passages should preferably be evenly distributed on the face of the wood ply to uniformly heat and harden the adhesive material According to one embodiment of the invention, the passages extend from one edge of the wood ply to an opposed edge thereof. Steam or hot air may be used as the heating fluid.

14 Claims, 6 Drawing Sheets

METHOD FOR BONDING WOOD MATERIALS

REFERENCE TO RELATED APPLICATIONS

This application is a continuation-in-part of U.S. Ser. No. 07/942,348, filed Sep. 9, 1992, now abandoned entitled "METHOD FOR BONDING WOOD MATERIALS", which is a continuation of Ser. No. 07/625,310, filed Dec. 10, 1990, now abandoned also entitled "METHOD FOR BONDING WOOD MATERIALS", the contents of which are incorporated herein by reference.

FIELD OF THE INVENTION

This invention relates to a method for bonding wood materials, such as particle board, veneers, and laminates, and particularly to a method for bonding wood materials which are relatively thin, compared with their width or length.

Products such as plywood, laminated veneer lumbers or laminated wood are produced by bonding wood plies together with a thermosetting adhesive material. Heat is applied to the wood plies to harden the thermosetting adhesive material. Since the hardening of the adhesive material bonds the wood plies together, the step of applying heat to the wood plies is important.

The conventional methods for bonding wood plies may be divided into two major types, according to the manner in which the heat is applied to the wood plies. The first employs heating plates which also serve as pressing plates. The second employs a high-frequency heating apparatus. According to the first bonding method which employs heating plates, wood plies are placed on one another with a thermosetting adhesive material between each ply. The layered plies are placed between the upper and lower heating plates, and are simultaneously heated by the heating plates (which are heated in advance), while the wood plies are pressed together by the heating plates. One advantage of this bonding method is that it does not require a complicated apparatus. In addition, it is inexpensive. However, with this bonding method, the adhesive material between the wood plies nearer the middle of the stack takes longer to heat or harden than the adhesive materials between the outer plies.

According to the second bonding method, which employs a high-frequency heating apparatus, wood plies placed on one another with an adhesive material between are heated by the high-frequency heating apparatus while the wood plies are being pressed together. With this bonding method, the adhesive material nearer the middle of the thickness of the stack of wood plies than the other adhesive materials therein does not take considerably longer to heat or harden than the other adhesive materials. However, this bonding method requires a complicated apparatus. Also, it is costly to use this bonding method.

In Japanese Patent Application No. 45-106515 for "Bonding Method for Manufacture of Plywood" (published under No. 49-43133), the Applicant proposed a third method for bonding wood plies, exclusively designed for veneer sheets, to eliminate the foregoing drawbacks of the conventional bonding methods. According to this bonding method, at least one of the veneer sheets to be bonded together is first "tenderized" to produce cracks therein. Then, the veneer sheets (with an adhesive material between) are pressed together with pressing plates while hot air is supplied from the edges of the veneer sheets into the cracks therein. The pressing plates are not used as heating plates and are not heated to set the adhesive material between the veneer sheets. Instead, the hot air supplied into the cracks hardens the adhesive material. However, the cracks produced by "tenderizing" the veneer sheets are small, and most are not in communication with other cracks. Hence, the hot air supplied from the edges of the veneer sheets does not reach the inner or central portions of the veneer sheets, nor does it pass from one edge of the veneer sheets to the other, so that it may take a very long time for the adhesive material to harden.

More importantly, there is an unavoidable disadvantage common to the foregoing three conventional bonding methods. With either of the first two bonding methods, the whole of the wood plies (to be bonded) is heated to set the adhesive material. It is also the case with the third method if in the third method all veneer sheets to be bonded together are tenderized. Because the moisture contained in the wood plies and the solvent (water in most cases) contained in the adhesive material is vaporized or heated to a very high temperature when these methods are employed, the wood plies are softened. Accordingly, when pressure is applied to the wood plies by the pressing plates, the plates tend to "crush" the wood plies and reduce the thickness of the whole of the bonded wood.

SUMMARY OF THE INVENTION

The object of the invention is to provide a method for bonding wood materials which is free from the last-mentioned disadvantage of the conventional bonding methods.

According to the invention, heat fluid passages are formed in at least one face of at least one wood ply. The passages should preferably be shallow, and evenly distributed in the surface of the wood. Each passage extends from one edge of the wood ply to a second edge thereof. Then, the wood plies are placed on one another with a thermosetting adhesive material or materials between. The wood plies are pressed together while a heating fluid is blown into the passages to heat and harden the thermosetting adhesive. As used herein, the heating fluid is a hot vapor or a hot gas, e.g., steam or hot air.

According to one aspect of the invention, the heat fluid passages extend from one edge of the wood ply to an opposed edge thereof.

According to another aspect of the invention, a first group of passages extends from a first edge of the wood ply to a second, opposed edge thereof, while a second group of passages extend from a third edge of the wood ply to a fourth edge, opposite the third edge.

According to still another aspect of the invention, a first group of passages extends from one edge of the wood ply to an opposed edge thereof, while a second group of passages diagonally intersects the first group.

BRIEF DESCRIPTION OF THE DRAWING

In FIG. 7 the wood plies are simultaneously pressed and conveyed by the mechanisms as shown;

In FIG. 8 the wood plies are being pressed by the pressing plates. The wood plies are intermittently conveyed;

DETAILED DESCRIPTION OF PREFERRED EMBODIMENTS

Figure 1:
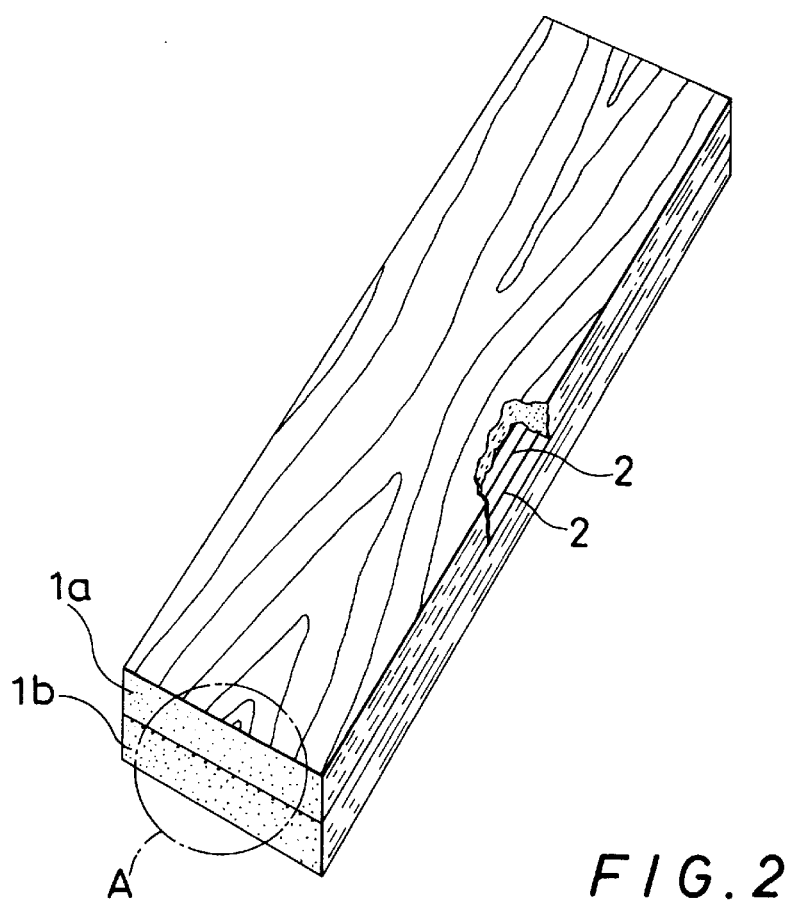
FIG. 1 is a partly-broken perspective view of two wood plies placed on each other with an adhesive material between. One of the wood plies is provided with heating fluid passages of the invention into which a heating fluid is provided to heat and harden the adhesive material.

Bonding materials according to the invention will now be described with reference to the figures of the drawing, wherein like reference numerals indicate corresponding parts.

Figure 2:
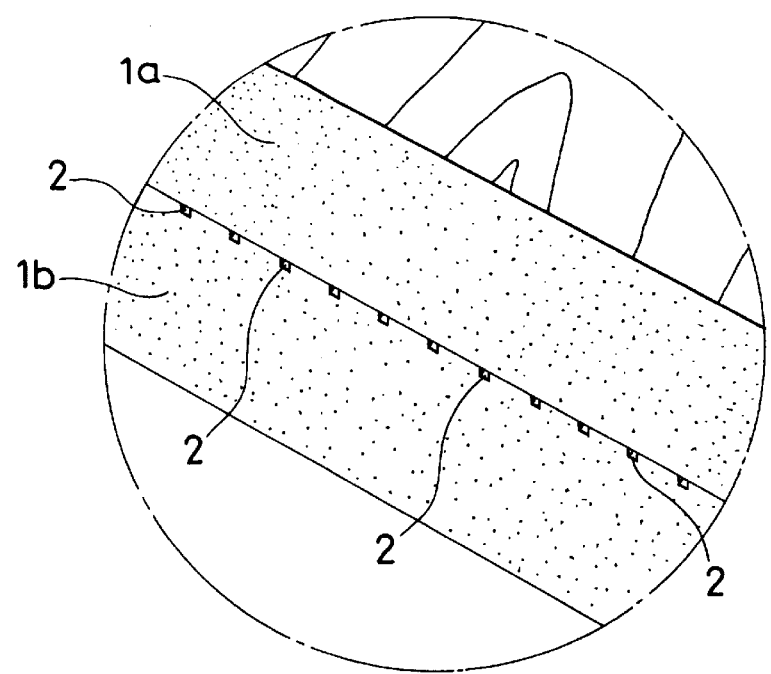
FIG. 2 is an enlarged view of a portion of the wood plies of FIG. 1 indicated by the letter A.

In FIG. 1 a wood ply 1a is placed on a wood ply 1b with a thermosetting adhesive material between. As illustrated in FIG. 2, the lower wood ply 1b is provided, on its upper face, with plural heating fluid passages 2 extending along the direction of the fibers of the wood ply 1b. Although not wholly shown, the heating fluid passages 2 extend from one edge of the wood ply 1b to the opposite edge thereof. Passages 2 are formed in the wood ply 1b before wood ply 1a is placed on wood ply 1b.

When the wood plies 1a and 1b of FIG. 1 are pressed together by pressing elements (not shown) such as pressing plates, a heating fluid (not shown), such as steam or hot air, is supplied or blown into the passages 2 from one or both ends of the passages 2. The heating fluid supplied into the passages 2 heats and hardens the thermosetting adhesive material between wood plies 1a and 1b causing wood plies 1a and 1b to bond together. Needless to say, the portions of the adhesive material which are located directly on passages 2 are directly heated by the heating fluid, while the other portions adjacent to the heating fluid passages 2 are heated indirectly. Reducing the space between passages reduces the heating time. Therefore, by selecting a particular pitch (the distance between one wall of one passage to the corresponding wall of a second passage), it is possible to ensure adequate heat transfer while reducing the heating time. A preferred pitch is in the range of about 1 mm to about 20 mm.

To ensure adequate heat transfer across the interface between the plies, the heating fluid passages are narrow in diameter, relative to their length. The diameter of the passages must be great enough to allow for adequate heat transfer without supplying the heating fluid at prohibitively high pressure. The diameter should also be narrow enough not to weaken the plies. The precise diameter of the passages will depend on the thickness of the ply and the width or length of the ply, and will be calculated according to the characteristics of the specific wood materials to be bonded. Passages having a width ranging from about 0.5 mm to about 8 mm and a depth ranging from about 0.5 mm to about 4 mm have been found to be particularly effective and are preferred. Passages having these dimensions permit the pressure of the heating fluid to be maintained in the range of about 1 to 6 atmospheres while dramatically reducing heating time from that conventionally required to about 3–15 minutes.

Thus, according to this bonding method, heating the pressing elements is unnecessary. The pressing elements are only used as such.

EXAMPLE I

On one face of a wood ply with a thickness of 30 millimeters heating fluid passages extending from edge to edge along the direction of the fibers of the wood ply are formed. The passages are spaced 6 millimeters apart from one another and each has a square vertical cross section with a width of 0.7 millimeter and a depth of 0.7 millimeter. The wood ply is bonded to another wood ply of the same thickness using a thermosetting adhesive material between the plies (as depicted in FIG. 1) while steam is provided into the passages at a pressure of 5 atmospheres by means of a heating fluid blower (which will be described later). Using this method, the adhesive material reached a temperature of approximately 100 degrees centigrade, several tens of times faster than when the previously-mentioned conventional bonding method using heating plates is employed and several times faster than in the case where the previously-mentioned conventional bonding method using a high-frequency heating apparatus is employed.

According to this bonding method, since only a part of wood plies 1a and 1b are heated, i.e., they are heated only in their portions surrounding the passages 2, wood plies 1a and 1b are not softened and, hence, are not "crushed" under the pressure from the pressing plates. Accordingly, the whole of the wood plies 1a and 1b is virtually not reduced in its thickness.

EXAMPLE II

Figure 3:
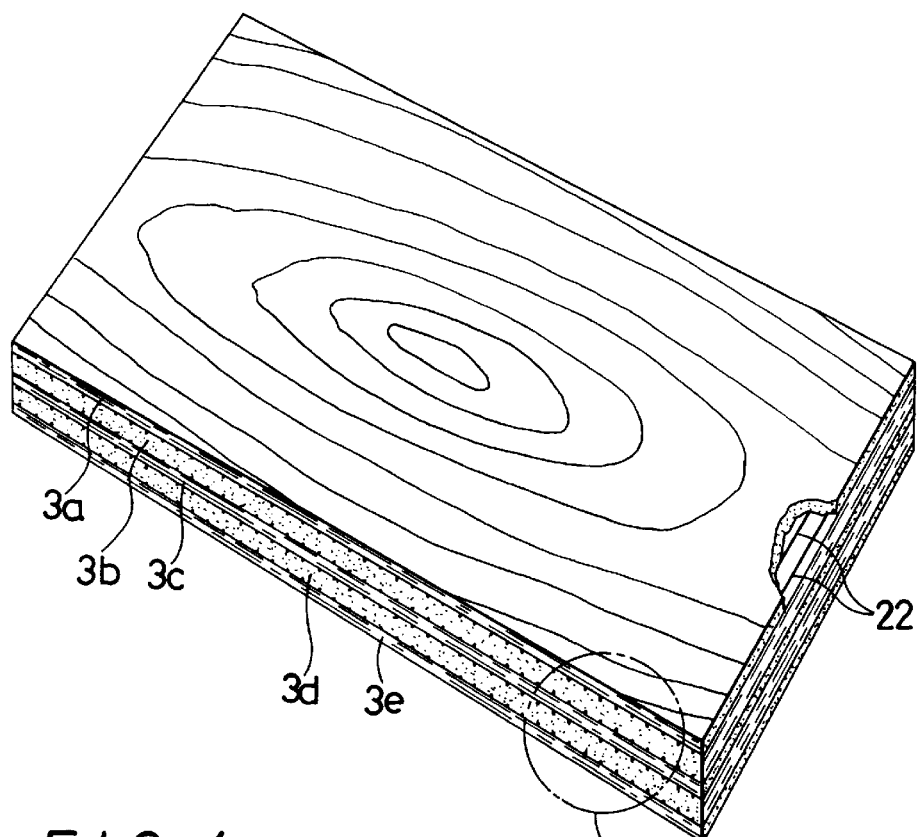
FIG. 3 is a partly-broken perspective view of wood plies placed on one another with adhesive materials between. Some of the wood plies are provided with passages.
Figure 4:
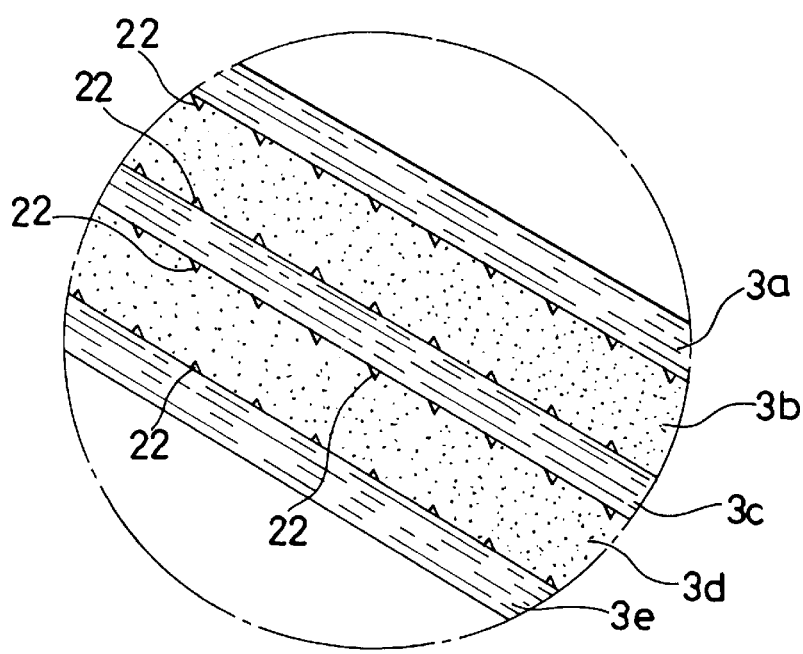
FIG. 4 is an enlarged view of a portion of the wood plies of FIG. 3 indicated by the letter B.

FIGS. 3 and 4 depict another embodiment of the invention. In FIG. 4 five wood plies 3a to 3e are placed on one another with thermosetting adhesive materials (not shown) between. The wood plies 3a to 3e are arranged so that the fibers of the adjacent wood plies extend perpendicular to each other. Wood ply 3b is provided, in each of its upper and lower faces, with passages 22 extending from one edge of wood ply 3b to the opposite edge along the direction of the fibers. Also, wood ply 3d is provided, in each of its upper and lower faces, with passages 22 extending from one edge of wood ply 3d to the opposite edge along the direction of the fibers.

When wood plies 3a to 3e of FIG. 3 are pressed together by pressing elements (not shown) such as pressing plates, a suitable heating fluid (not shown) such as steam, hot air or other hot fluid is supplied or blown into passages 22 from one or both ends of passages 22. The heating fluid supplied into the passages 22 heats and hardens the adhesive materials between wood plies 3a to 3e to bond wood plies 3a to 3e together.

As with the first embodiment of FIGS. 1 and 2, it is not necessary to heat the pressing elements in advance. The pressing elements are only used as such. Similarly, since wood plies 3a to 3e are heated only in part, i.e., only in the portion surrounding the passages 22, wood plies 3a to 3e are not softened and, hence, are not "crushed" by the pressure applied by the pressing plates. Accordingly, the whole of wood plies 3a to 3e is virtually not reduced in its thickness.

EXAMPLE III

Figure 5:
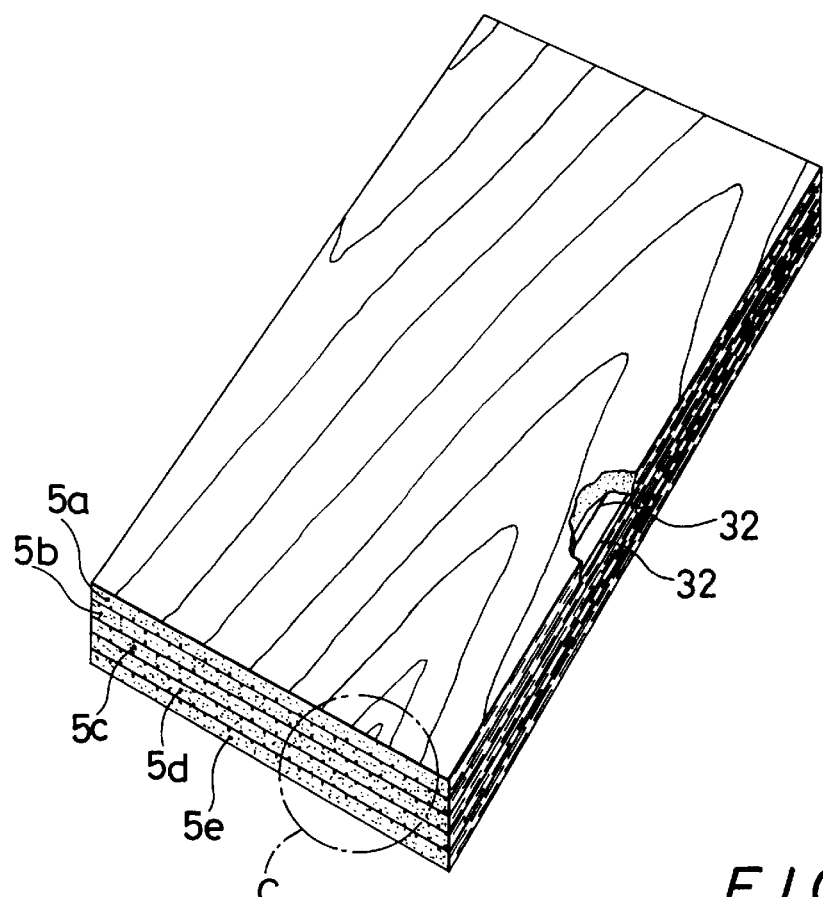
FIG. 5 is also a partly-broken perspective view of wood plies placed on one another with adhesive materials between. All the wood plies are provided with passages.
Figure 6:
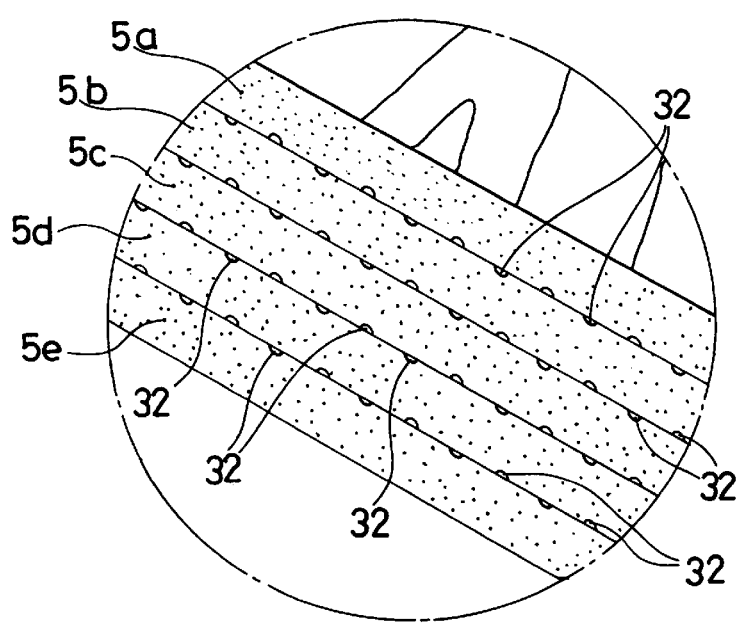
FIG. 6 is an enlarged view of a portion of the wood plies of FIG. 5 indicated by the letter C.

FIGS. 5 and 6 depict a third embodiment of the invention. In FIG. 5 five wood plies 5a to 5e are placed on one another with thermosetting adhesive materials (not shown) between. The wood plies 5a to 5e are so placed that the fibers of all wood plies 5a to 5e extend in the same direction. The uppermost wood ply 5a is provided with passages 32 only in its lower face. The lowermost wood ply 5e is provided with passages 32 only in its upper face. Each intermediate wood ply (5b, 5c and 5d) is provided with passages 32 in both its upper and lower faces. The passages 32 of each wood ply (5a to 5e) extend from edge to edge along the direction of the fibers of the wood ply. Unlike the upper and lower passages 22 of each of the wood plies 3b and 3d of FIGS. 3 and 4, the upper and lower passages 32 of each intermediate wood ply (5b, 5c and 5d) are not vertically aligned.

When wood plies 5a to 5e are pressed together by pressing elements (not shown) such as pressing plates, a suitable heating fluid (not shown) such as steam, hot air, or other hot fluid is supplied or blown into the passages 32. The fluid supplied into the passages 32 heats and hardens the adhesive materials between wood plies 5a to 5e. Thus wood plies 5a to 5e are bonded together in the same advantageous manner as in the first and second embodiments.

Each passage 2 of FIGS. 1 and 2 has a square vertical cross section. Each passage 22 of FIGS. 3 and 4 has a triangular vertical cross section. Each passage 32 of FIGS. 5 and 6 has a semicircular vertical cross section. These shapes are only examples of those which may be used in the practice of the invention and is not intended to be limiting. The passage of the invention may have any other vertical cross section which allows passage of a sufficient amount of heating fluid to heat and harden the adhesive material.

With regard to direction, passages may be formed along the direction of the fibers of the wood ply (as in the foregoing three embodiments) or in other suitable direction, including perpendicular to the fibers of the wood ply If passages are formed along the direction of the fibers of the wood ply, as illustrated in the following Examples, such passages may have relatively large vertical cross sections and relatively great depths since such passages make few cuts in the fibers of wood and, hence, do not substantially affect the mechanical strength of the wood ply. In contrast, if passages are formed perpendicular to the fibers of the wood ply, as described in Example VI, it is preferable to form relatively shallow passages with a relatively small vertical cross section since such perpendicular passages cut the fibers of the wood at many places and may substantially affect the mechanical strength of the wood ply if the cross section or depth of the passage is too great. Also, if passages are formed perpendicular to the fibers of the wood ply such passages should preferably have as few angles as possible in the vertical cross section.

EXAMPLE IV

With regard to means for forming the passages, a cutting machine with a cutting blade, a compressing molding machine with a projecting member, a combination thereof, or other suitable means may be used.

A cutting blade may be advantageously used to form clear-cut passages. Thus, the passages formed thereby allow a heating fluid to flow smoothly and constantly there through. Hence, the adhesive material may be heated and hardened uniformly. However, the passages formed by a cutting blade will remain. Accordingly, the larger the vertical cross sections of the passages are, the more the mechanical strength or aesthetic appearance of a product is affected. (However, an adverse effect of the remaining passages may be avoided by applying putty to the passages.)

If a compression molding machine is used to form passages, the above-mentioned drawback may be avoided. That is, a passage formed by compression molding a wood ply at least partly becomes "smaller" or "closed" since the portion of wood ply compressed by the machine at least partly returns gradually to the original position. However, it is important for the passage to remain until a bonding operation has been completed. Therefore, the length of time until bonding will take place, and the moisture content of the wood ply are both important considerations.

Experiment A

On one surface of wood ply having a thickness of 30 millimeters, width of 300 millimeters, and a length of 500 millimeters in the direction of the fibers, passages extending in the direction of fibers as shown in FIG. 1 and FIG. 2 are formed by a cutting machine with a cutting blade. The dimension and the pitch of the passages are as listed in Table 1. Meanwhile, urea resin adhesives are applied onto one surface of another wood ply. The two wood plies are then layered so that the surface with passages and the surface with adhesives come into contact with each other. Hot vapor at an air pressure shown in Table 1 is then blown for a time period of Table 1 from one end to the other end of the passages by means of an apparatus shown in FIG. 12. The method results in a good bonding efficiency.

TABLE 1

|   | Width of Passages (mm) | Depth of Passages (mm) | Pitch of Passages (mm) | Air Pressure (atm) | Time (min.) |
| --- | --- | --- | --- | --- | --- |
| A | 0.5 | 1 | 12 | 4 | 10 |
| B | 1 | 1 | 10 | 4 | 8 |
| C | 1 | 1 | 8 | 4 | 8 |
| D | 2 | 1 | 8 | 5 | 6 |
| E | 2 | 2 | 8 | 4 | 6 |
| F | 4 | 1 | 7 | 4 | 4 |
| G | 1 | 1 | 5 | 2 | 15 |

Experiment B

On one surface of a wood ply having a thickness of 30 millimeters, width of 300 millimeters, and a length of 500 millimeters in the direction of the fibers, passages extending in the direction of fibers are formed by a process of compression molding using a compression molding machine with a projecting member. The dimension and the pitch of the passages are so listed in Table 2. Urea resin adhesives are applied onto one surface of another wood ply. The two wood plies are then layered so that the surface with passages and the surface with adhesives come into contact with each other. Hot vapor at an air pressure shown in Table 2 is then blown from one end to the other end of the passages for a period of Table 2 by means of an apparatus shown in FIG. 12. Consequently, good bonding efficiency is achieved.

TABLE 2

| | Width of Passages (mm) | Depth of Passages (mm) | Pitch of Passages (mm) | Air Pressure (atm) | Time (min.) |
| --- | --- | --- | --- | --- | --- |
| H | 0.5 | 0.5 | 8 | 4 | 7 |
| I | 1 | 1 | 8 | 4 | 6 |
| J | 1 | 1 | 5 | 4 | 5 |
| K | 1 | 1 | 4 | 3 | 6 |
| L | 2 | 1 | 6 | 4 | 5 |

If conventional bonding methods were employed to bond for the wood plies described in Experiments A and B, bonding would require approximately 30 minutes. By employing the method of the present invention, bonding time is markedly reduced, as shown in Tables 1 and 2.

EXAMPLE V

If passages are formed perpendicular to the fibers of the wood ply, such passages preferably should be formed in meandering, zigzag or winding lines. Such an arrangement will affect the mechanical strength of the wood ply to a lesser degree than a straight arrangement.

Furthermore, if passages are formed diagonally across the fibers of the wood ply whether in straight lines, in meandering lines or in zigzag lines, such an arrangement will also affect the mechanical strength of the wood ply to a lesser degree than the arrangement where passages intersect the fibers of the wood ply in straight lines.

As described above, if passages are formed along the direction of the fibers of the wood ply, such passages may have relatively large vertical cross sections and relatively great depths. Such passages, however, are not suitable for a bonding operation similar to that shown in FIG. 7, where wood plies 7 are placed on one another such that the fibers of all or most of the wood plies 7 extend in the direction in which plies 7 are conveyed and pressed, and are pressed together by upper and lower pressing and conveying mechanisms 4a and 4b. Such passages are unsuitable because it is difficult to blow a heating fluid into the passages of the wood plies when the wood plies are passed between the pressing and conveying mechanisms. Similarly, and for the same reason, passages running in the direction of the fibers are not suitable for a bonding operation as shown in FIG. 8, which is similar to that of FIG. 7 except that in FIG. 8 wood plies 8 are intermittently pressed together by upper pressing plates 6a, 6c and lower pressing plates 6b, 6d while being intermittently conveyed.

Figure 9:
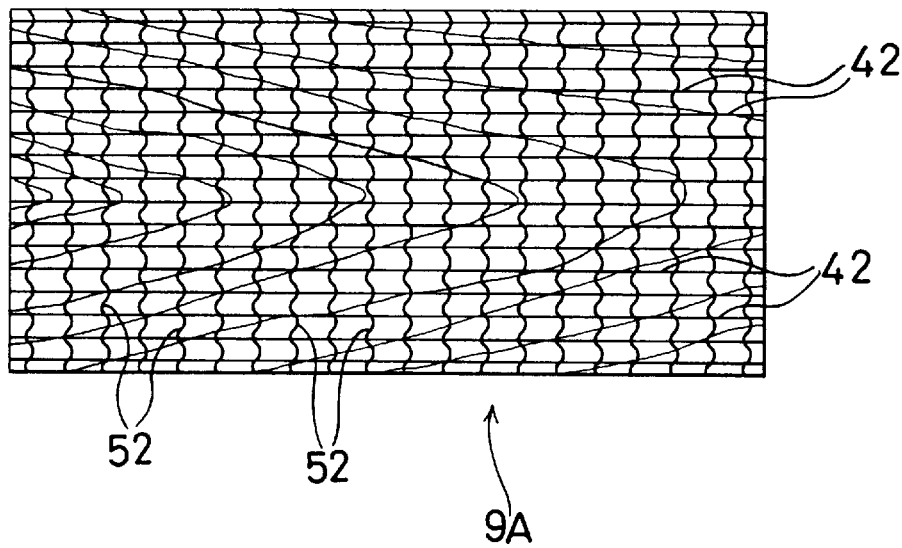
FIG. 9 is a plan view of a wood ply having in its surface a first group of passages extending in one direction and a second group of passages extending perpendicular to the first group.

FIG. 9 depicts a different embodiment of the invention. FIG. 9 is a plan view of a wood ply 9A. The wood ply 9A is provided in its surface with two kinds of passages, i.e., passages 42 extending along the direction of the fibers of wood ply 9A and passages 52 extending perpendicular to the fibers thereof in meandering lines.

Figure 10:
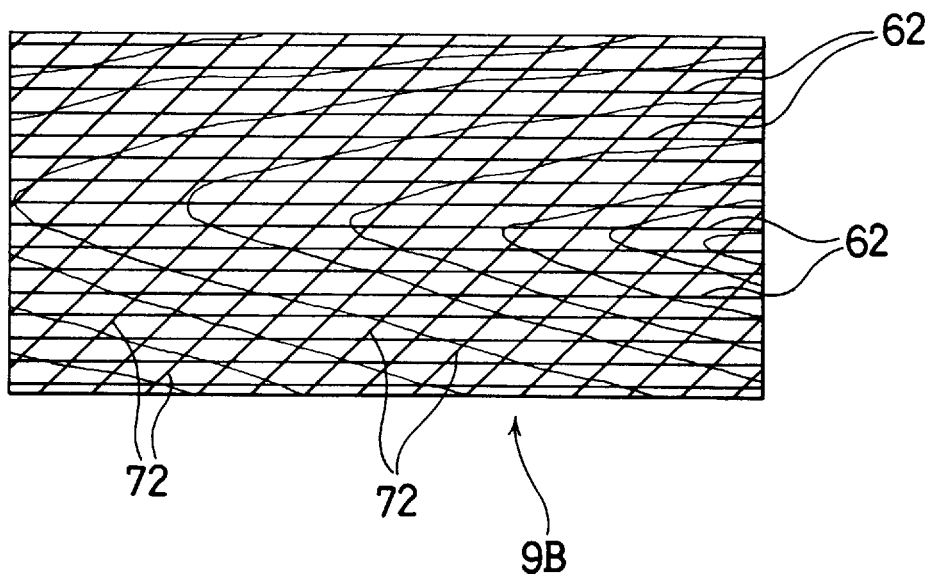
FIG. 10 is a plan view of a wood ply having in its surface a first group of passages extending in one direction and a second group of passages extending diagonally across the first group of passages.

FIG. 10 depicts another different embodiment of the invention. FIG. 10 is a plan view of a wood ply 9B. The wood ply 9B is provided in its surface with two kinds of passages, i.e., passages 62 extending along the direction of the fibers of wood ply 9B and passages 72 extending diagonally across the passages 62. The following experiment illustrates a variety of dimensions and pitch to further reduce bonding time while maintaining good bonding efficiency.

Experiment C

On one surface of a wood ply having a thickness of 30 millimeters, width of 300 millimeters, and a length of 500 millimeters in the direction of the fibers, a first group of passages extending in the direction of fibers are formed by a cutting machine with a cutting blade. A second group of passages that extends diagonally across the first group of passages are then formed on the same surface by cutting, to produce a wood ply as shown in FIG. 10. The dimension and the pitch of the first and second group of passages are as listed in Table 3. Meanwhile, urea resin adhesives are applied onto one surface of another wood ply. The two wood pies are then layered so that the surface with passages and the surface with adhesives come into contact with each other, and hot vapor at an air pressure shown in the Table 3 is blown for a period of Table 3 from one end through the other end of the passages by means of an apparatus shown in FIG. 12. This method results in good bonding efficiency, with a marked reduction in time over the time required for a conventional hot plate press which would take approximately 30 minutes.

TABLE 3

| | Width of Passages (mm) | Depth of Passages (mm) | Pitch of Passages (mm) | Air Pressure (atm) | Time (min.) |
| --- | --- | --- | --- | --- | --- |
| M | 0.5 | 1 | 15 | 3 | 5 |
| O | 1 | 1 | 15 | 3 | 5 |
| P | 2 | 1 | 20 | 3 | 4 |
| Q | 1 | 1 | 15 | 2 | 8 |

Needless to say, the smaller the spaces between the passages are, the more rapidly the adhesive material hardens. In other words, the smaller the pitch or the number of passages, the more rapidly the adhesive material hardens.

With a wood ply, heat is transmitted more rapidly in the direction of the fibers than in the direction perpendicular thereto. Because of this, the passages 22 of FIGS. 3 and 4 which are formed in wood ply 3b or 3d along the direction of its fibers and on which wood ply 3a, 3c or 3e is placed with its fibers extending perpendicular to the passages 22 may be separated from one another by greater distances than the passages 2 of FIGS. 1 and 2 which run in wood ply 1b along the same direction as its fibers and on which wood ply 1a is placed with its fibers extending in the same direction as the passages 2 or the passages 32 of FIGS. 5 and 6 which run in wood plies 5a to 5e along the same direction as the fibers.

EXAMPLE VII

Figure 11:
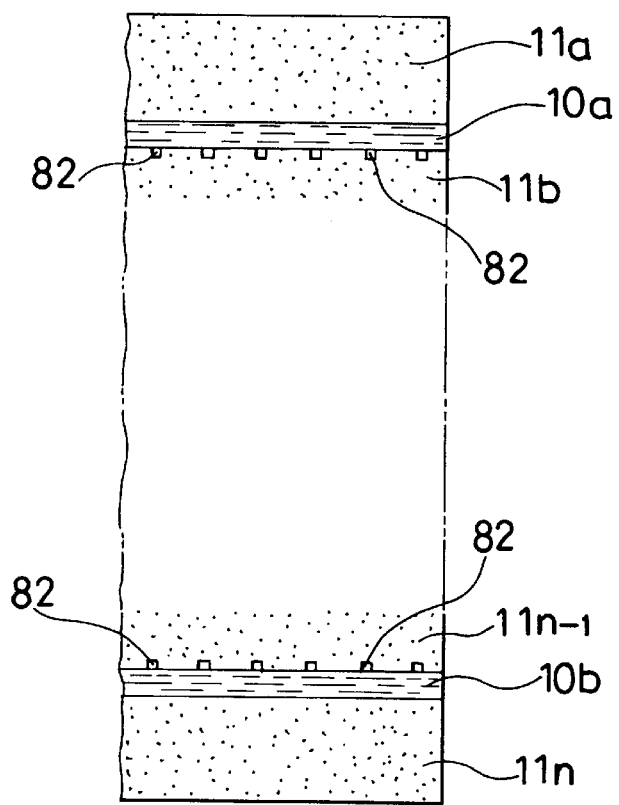
FIG. 11 shows a possible mode of the bonding method of the invention.

In FIG. 11 plural thick wood plies 11a to 11n are placed on one another. A thin wood ply 10a is located between the upper-most thick wood ply 11a and a second thick wood ply 11b. Also, a thin wood ply 10b is located between a lower-most thick wood ply 11n; and a second thick wood ply $11_{n-1}$ from the bottom. The thick wood plies 11a to 11n are placed with their fibers extending in the same direction, while the thin wood plies 10a and 10b are placed with their fibers extending perpendicular to the fibers of the thick wood plies 11a to 11n. The wood plies may be bonded together to produce a product which looks as if it is a "solid" product, or a product not produced by connecting plural members together, but consisting of only one material. The thin width plies 10a and 10b are used to prevent the whole of the wood plies from curving or twisting in the direction perpendicular to the fibers of the thick wood plies. To bond the thick wood plies 11b to $11_{n-1}$ together, it is necessary that passages (not shown) be provided in at least one of the faces contacting the adjacent faces of wood plies 11b to $11_{n-1}$. However, the upper-most thick wood ply 11*a* and the thin wood ply 10 can be bonded to each other when a heating fluid is supplied into passages 82 provided in the upper surface of the thick wood ply 11*b*. It is because the heating fluid supplied into the passages 82 heats the adhesive material between the uppermost thick wood ply 11*a* and the thin wood ply 10*a* through the thin wood ply 10*a*. Similarly, no passages are provided in the lower surface of the thin wood ply 10*b* nor in the upper surface of the lowermost thick wood ply 11*n*. However, the thin wood ply 10*b* and the lowermost thick wood ply 11*n* can be bonded to each other when a heating fluid is supplied into passages 82 provided in the lower surface of the second thick wood ply $11_{n-1}$ from the bottom. Thus, except for a case where only two wood plies are bonded together (as in the embodiment of FIG. 1), the invention does not always require that passages exist in at least one of the contacting faces of adjacent wood plies.

Where passages are provided in each surface of wood plies which will contact the face of another ply (as in FIG. 6), the passages should preferably be so located as to be out of alignment with the passages in the adjacent surface. Such an arrangement contributes toward an effective heating of the adhesive material.

A conventional bonding method may also be used in combination with the bonding method of the invention. For example, no passages may be provided in outer wood plies, but only middle wood plies may have passages. In such a case, pressing plates heated in advance may be used to heat the adhesive materials between the outer wood plies.

Needless to say, it is not necessary to form passages in the uppermost or lowermost surface of wood plies to be bonded. However, if, for example, a product obtained by bonding the wood plies together is to be connected to other material such as mortar, passages may be additionally provided in the uppermost or lowermost surface of the wood plies.

With regard to the heating fluid, steam, hot air or a combination thereof may be used as such. The heating fluid may be supplied or blown into a passage from one or both ends. If it is blown from both ends of a passage, it preferably should be blown alternately from one side (i.e., the side of one end of the passage) and the opposite side (i.e., the side of the opposite end thereof).

Figure 12:
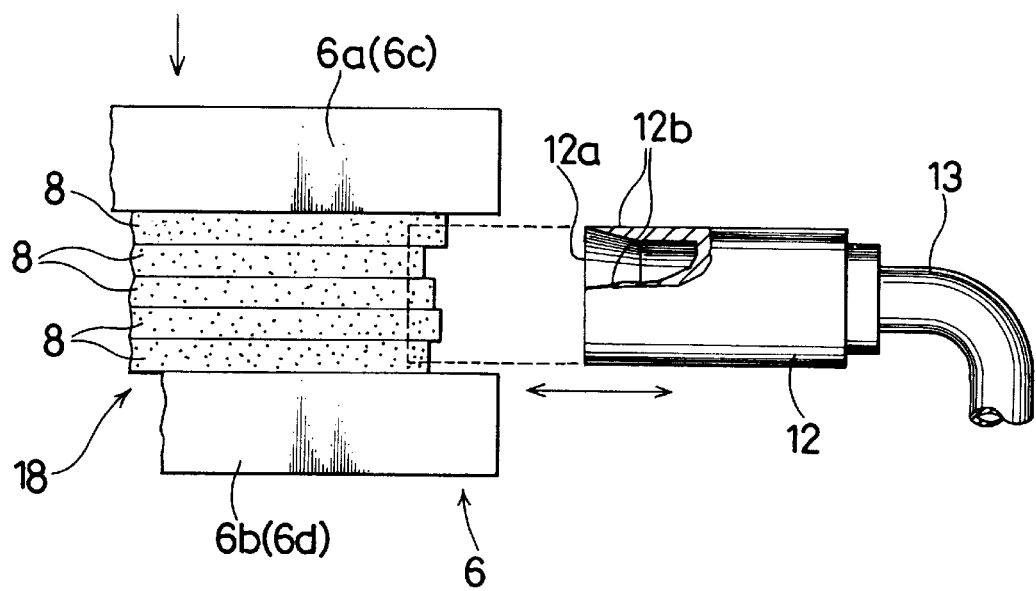
FIG. 12 shows a hot steam blower which may be used for the bonding method of the invention.

It is easy to obtain steam with a pressure much higher than the atmospheric pressure and with a high heat value. Such steam will heat and harden an adhesive material more rapidly than hot air. Also, if such steam is used, the passages may be smaller (in their vertical cross sections) and less clear-cut than when hot air is used. Also, experiments have shown that, if part of the moisture resulting from a condensation of the steam is absorbed by the wood plies, the product obtained by bonding the wood plies is not adversely affected for all practical purposes. However, if wood plies are not placed accurately on one another, i.e., if wood plies are not so placed that their edges are vertically aligned, the steam supplied into the passages may "leak" from the wood plies through the portions of the passages that are exposed to the outside. This causes a loss of energy, and also may be a dangerous situation because of the high heat value of the steam. To avoid this, the nonaligned end portions of the wood plies may be cut before the bonding operation to ensure that the wood plies have aligned edges. Alternatively, a hot steam blower 12 of FIG. 12 may be used to prevent a leakage of the steam without cutting the nonaligned edges of the wood plies. In FIG. 12 edges of wood plies 8 located between an upper pressing plate 6*a* and a lower pressing plate 6*d* are not vertically aligned with one another. The wood plies 8 are so placed that the fibers thereof extend in the direction in which the wood is conveyed before and after a bonding operation. The wood plies 8 have passages formed along the direction of the fibers. The steam blower 12 comprises a steam pipe 13 and a blowing head 12*a* connected thereto. The blowing head 12*a* is large enough to cover the passages of all the wood plies 8. The blowing head 12*a* includes a sharp-edged wall 12*b* defining an outlet of the blower through which steam from the pipe 13 is blown. In use, the blower 12 is so moved that the sharp edge of the wall 12*b* cuts into the wood plies 8 as indicated by a dotted line, and then steam is blown into the passages. Since the blowing head 12*a* covers the ends of all the passages from which the steam is blown, it is not possible for the steam to leak from the wood plies. The nonaligned edges of the wood plies 8 may be cut after the bonding operation.

With regard to hot air as a heating fluid, it is very difficult to obtain hot air with a pressure which is much higher than the atmospheric pressure. With hot air, a heating rate higher than that of steam cannot be expected. However, the heating rate of hot air is higher than that provided by the previously-mentioned conventional bonding method employing heating plates which also serve as pressing plates. Also, if the hot air leaks from the wood plies, it is a less serious loss of energy than when steam is lost because of the lower heat value of the hot air. For this reason, vertical non-alignment of edges of the wood plies is less critical. However, if hot air is used, the passages must not be blocked by excess adhesive material because hot air is less capable of forcing aside excess adhesive material in a passage than steam. Applying an adhesive material to a surface of a wood ply having no passages will prevent the passages from being blocked by excess adhesive material. Also, blowing steam into the passages under high pressure or pressurized air with a normal temperature and a high pressure will remove excess adhesive material from the passages.

Figure 7:
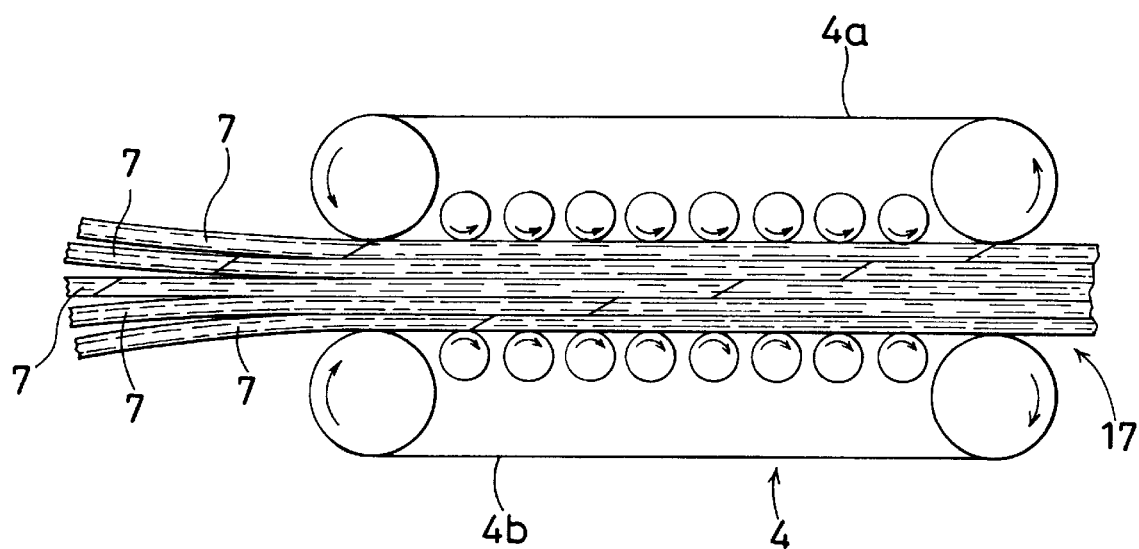
FIG. 7 shows wood plies between upper and lower pressing and conveying mechanisms such that the fibers of the wood plies extend along the direction of conveyance.
Figure 8:
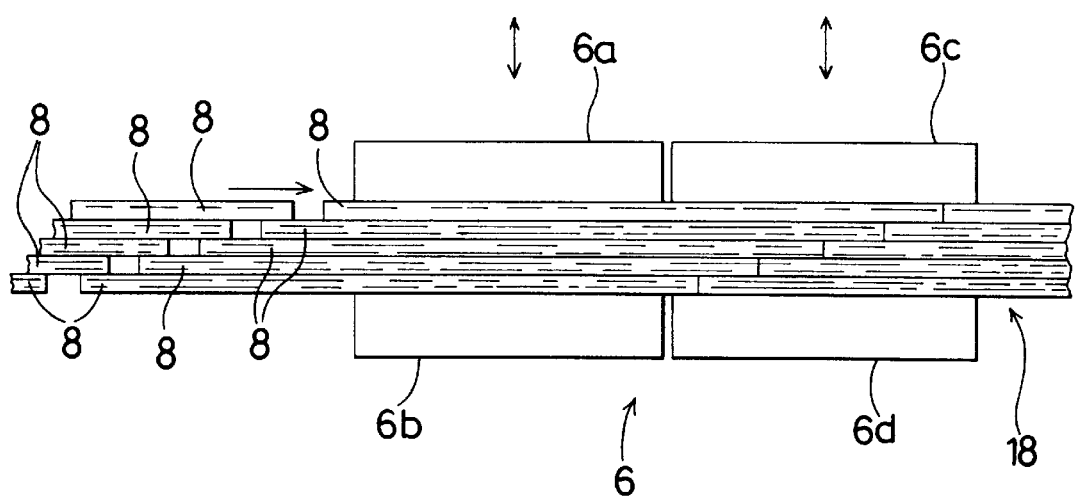
FIG. 8 shows wood plies between upper and lower pressing plates and aligned such that the fibers extend in the direction of conveyance.

If the steam blower 12 of FIG. 12 is adapted to be moved both in a direction of conveyance of wood plies and in the opposite direction, the blower 12 may be used for the bonding operation of FIG. 7. In addition, the blower 12 may be modified for use as a hot air blower.

Equivalents

The bonding method of the invention can be used to bond not only wood plies, but also wood materials with the same dimensions in thickness (depth and width or with the same dimensions in thickness, width and length.

In addition, the bonding method of the invention can also be used to bond a wood material and other material than wood.

Those skilled in the art will recognize, or be able, to ascertain, using no more than routine experimentation, numerous equivalents to the specific procedures described herein. Such equivalents are considered to be within the scope of this invention and are covered by the following claims.

What is claimed is:

1. A method for bonding wood plies together, comprising the steps of
   (i) providing plural wood plies for assembly together to form plywood or a veneer laminate,
   (ii) selecting the width, depth and pitch of passages to be formed in at least one face of at least one of said plural wood plies to be bonded together,
   (iii) forming said passages in said at least one face of at least one of said plural wood plies to be bonded together, said one face forming an interface with another one of said plural wood plies when said plural wood plies are bonded together, each of said passages extending continuously from a first edge of said at least one of said plural wood plies to a second edge thereof, and said passages being substantially evenly distributed across said one face, (iv) placing said plural wood plies in face to face abutment with a thermosetting adhesive material therebetween, (v) selecting a heating fluid from the group of fluids consisting of hot vapor and hot air, (vi) blowing said selected heating fluid through said passages, from said first edge of said at least one of said plural wood plies to said second edge thereof, to heat and set the adhesive material, said heating fluid heating only portions of the plies surrounding the passages, (vii) concurrently with said blowing step, pressing said plural wood plies together in a direction perpendicular to said interfaces between said wood plies for forming said plywood or veneer laminate, wherein the plies contain an amount of moisture which if vaporized would soften said plies so as to allow a reduction of thickness of the whole of said wood plies during said pressing step, and wherein the width, depth and pitch of said passages is selected such that the whole of said plural wood plies is virtually not reduced in thickness during pressing.

2. A method in accordance with claim 1 wherein said blowing step further comprises blowing said selected heating fluid through said passages at a selected pressure not exceeding about 5 atm, and wherein said width, depth and pitch of said passages is selected such that said plies are not substantially weakened by said passages.

3. A method in accordance with claim 1 wherein said passages extend from a first edge of said at least one wood ply to an opposed second edge thereof, wherein said first edge is parallel to said opposed second edge.

4. A method in accordance with claim 1 wherein said step of blowing includes providing a blower head for blowing said heating fluid, said blower head having a sharp-edged wall defining an outlet of the blower head for penetrating the edges of said wood plies such that selected heating fluid is blown from said outlet into said passages that extend from said first end of said wood ply without leakage of said heating fluid, and moving said blower head such that said sharp wall penetrates the edges of said plies sufficiently to prevent said leakage.

5. A method in accordance with claim 1 wherein said step of selecting the width, depth and pitch of said passages includes selecting a depth of about 0.7 mm.

6. A method in accordance with claim 1 wherein the step of selecting the width, depth and pitch of the passages includes selecting a pitch of about 6 mm.

7. The method of claim 1 wherein the step of selecting the width, depth and pitch of said passages includes the step of selecting a depth of about 0.7 mm, a width of about 0.7 mm and a pitch of about 6 mm, and wherein the thickness of said plies to be bonded is about 30 mm.

8. A method for bonding wood plies together, comprising the steps of (i) providing plural wood plies for assembly together to form plywood or a veneer laminate, each of said wood plies having a grain, (ii) selecting the width, depth and pitch of passages to be formed in at least one face of at least one of said plural wood plies to be bonded together, (ii) forming first ones of said passages in said at least one face of at least one of said wood plies to be bonded together, said one face forming an interface with another one of said wood plies when said wood plies are bonded together, said first passages extending continuously from a first edge of said at least one of said wood plies to one of the other edges thereof, (iii) forming second ones of said passages in said at least one face of said at least one of said wood plies to be bonded together, said second passages intersecting said first passages and extending from a third edge of the wood ply to at least one other edge thereof, (iv) placing said wood plies in face to face abutment with a thermosetting adhesive material therebetween, (v) selecting a heating fluid from the group of fluids consisting of hot vapor and hot air, (vi) blowing said selected heating fluid into at least one of said first and second passages to heat and set the adhesive material, said heating fluid heating only portions of the plies surrounding the passages, and (vii) pressing said wood plies together in a direction perpendicular to said interfaces between said wood plies, concurrently with said blowing step for forming said plywood or veneer laminate, wherein the plies contain an amount of moisture which if vaporized would soften said plies so as to allow a reduction of thickness of the whole of said wood plies during said pressing step, and wherein the whole of said wood plies is virtually not reduced in thickness during pressing.

9. A method in accordance with claim 8 wherein said blowing step further comprises blowing said selected heating fluid at a pressure not exceeding about 5 atm, and wherein the depth, width and pitch of said passages is selected such that said wood plies are not substantially weakened by said passages.

10. A method in accordance with claim 8 wherein said first passages extend between said first edge of said at least one of said wood plies and a second edge thereof opposed and parallel to the first edge, and said second passages extend, in meandering lines, from a third edge of said at least one of said wood plies to a fourth edge thereof opposed and parallel to the third edge, wherein the grain of most of said wood plies extends in a first direction parallel to said first passages, and wherein said step of pressing further including the step of conveying said wood plies along said first direction and said step of blowing includes blowing said heating fluid into said second passages.

11. A method in accordance with claim 8 wherein said second passages extend diagonally across said first passages, wherein the grain of most of said wood plies extends in a first direction diagonal to said first and second passages, and wherein said step of pressing further including the step of conveying said wood plies along said first direction.

12. A method for bonding wood plies together, comprising the steps of (i) providing plural wood plies for assembly together to form plywood or a veneer laminate, said plies having a selected moisture content, (ii) forming passages in at least one face of at least one of said plural wood plies to be bonded together, said one face forming an interface with another one of said wood plies when said wood plies are bonded together, each of said passages extending continuously from a first edge of said at least one of said wood plies to a second edge thereof, said passages being substantially evenly distributed across said one face and being formed by a projecting member of a compression molding machine, (iii) placing said wood plies in face to face abutment with a thermosetting adhesive material therebetween, (iv) selecting a heating fluid from the group of fluids consisting of hot vapor and hot air, (v) blowing said selected heating fluid through said passages, from said first edge of said at least one wood ply to said second edge thereof, to heat and set the adhesive material, said heating fluid heating only portions of the plies surrounding the passages, and (vi) concurrently with said blowing step, pressing said wood plies together in a direction perpendicular to said interfaces between said wood plies for forming said plywood or veneer laminate, wherein the plies contain an amount of moisture which if vaporized would soften said plies so as to allow a reduction of thickness of the whole of said wood plies during said pressing step, and wherein said moisture content of said at least one wood ply is selected such that said passages tend to close after the forming thereof, thereby reducing the weakening of said at least one of said wood plies due to said passages, and said steps subsequent to said forming step are performed before said passages have sufficiently closed so as to prevent the performance thereof and wherein the whole of the wood plies is virtually not reduced in thickness during said pressing step.

13. A method for bonding wood plies together, comprising the steps of (i) providing plural wood plies for assembly together to form plywood or a veneer laminate, each of said wood plies having the grain thereof substantially extending between opposed edges thereof, (ii) selecting the width, depth and pitch of passages to be formed in both faces of at least one of said plural wood plies to be bonded together, (iii) forming said passages in both faces of at least one of said plural wood plies to be bonded together, said passages extending in a first direction along the grain of said at least one of said plural wood plies, each of said faces forming an interface with other said plural wood plies when said plural wood plies are bonded together, each of said passages extending continuously from a first edge of said at least one wood ply to a second edge thereof, and said passages being substantially evenly distributed across said faces, (iv) refraining from forming passages in said other of said plural wood plies with which said faces of said at least one ply form interfaces, (v) placing said plies in face to face abutment, with a thermosetting adhesive material therebetween, such that the grain and said passages of said at least one of said plural wood plies extend transverse to the grain of said wood plies abutting the faces of said at least one ply, (vi) selecting a heating fluid from the group of fluids consisting of hot vapor and hot air, (vii) blowing said selected heating fluid through said passages, from said first edge of said at least one of said plural wood plies to said second edge thereof, to heat and set the adhesive material, said heating fluid heating only the portion of the plies surrounding the passages, and (viii) concurrently with said blowing step, pressing said plural wood plies together in a direction perpendicular to said interfaces between said plural wood plies for forming said plywood or veneer laminate wherein the plies contain an amount of moisture which if vaporized would soften said plies so as to allow a reduction of thickness of the whole of said wood plies during said pressing step, and wherein the width, depth and pitch of said passages are selected such that said wood plies are not substantially softened during bonding, the whole of said wood plies is virtually not reduced in thickness during pressing, and said wood plies are not substantially weakened by the presence of said passages.

14. A method for bonding wood plies together, comprising the steps of (i) providing plural wood plies for assembly together to form a laminate, (ii) selecting the width, depth and pitch of passages to be formed in at least one face of at least one of said plural wood plies to be bonded together, (iii) forming said passages in said at least one face of at least one of said plural wood plies to be bonded together, said one face forming an interface with another one of said plural wood plies when said plural wood plies are bonded together to form said laminate, each of said passages extending continuously from a first edge of said at least one of said plural wood plies to a second edge thereof, and said passages being substantially evenly distributed across said one face, (iv) placing said plural wood plies in face to face abutment with a thermosetting adhesive material therebetween, (v) blowing steam through said passages to clear said passages of excess adhesive, (vi) selecting hot air as a heating fluid, (vii) blowing said selected heating fluid through said passages at a pressure not exceeding about one atmosphere, from said first edge of said at least one of said plural wood plies to said second edge thereof, to heat and set the adhesive material, and (viii) concurrently with said blowing step, pressing said plural wood plies together in a direction perpendicular to said interfaces between said wood plies, wherein the width, depth and pitch of said passages is selected such that the plies are not substantially weakened by the presence of the passages and such that the whole of said plural wood plies is virtually not reduced in thickness during pressing.

* * * * *